(12) United States Patent
Hamamoto et al.

(10) Patent No.: US 11,913,522 B2
(45) Date of Patent: Feb. 27, 2024

(54) V-RIBBED BELT AND MANUFACTURING METHOD FOR SAME

(71) Applicant: Mitsuboshi Belting Ltd., Kobe (JP)

(72) Inventors: Kouhei Hamamoto, Hyogo (JP);
Takeshi Nishiyama, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 1132 days.

(21) Appl. No.: 16/615,963

(22) PCT Filed: May 23, 2018

(86) PCT No.: PCT/JP2018/019874
§ 371 (c)(1),
(2) Date: Nov. 22, 2019

(87) PCT Pub. No.: WO2018/216738
PCT Pub. Date: Nov. 29, 2018

(65) Prior Publication Data
US 2020/0173523 A1 Jun. 4, 2020

(30) Foreign Application Priority Data

May 24, 2017 (JP) .................................. 2017-102797
May 21, 2018 (JP) .................................. 2018-097341

(51) Int. Cl.
*B32B 5/08* (2006.01)
*B32B 5/02* (2006.01)
(Continued)

(52) U.S. Cl.
CPC ............... *F16G 5/20* (2013.01); *B32B 5/026* (2013.01); *B32B 5/08* (2013.01); *B32B 25/04* (2013.01);
(Continued)

(58) Field of Classification Search
CPC ..... F16G 5/08; F16G 5/20; F16G 5/22; B32B 5/026
See application file for complete search history.

(56) References Cited

U.S. PATENT DOCUMENTS 3,964,328 A    6/1976  Redmond, Jr.
4,305,714 A *  12/1981 Renshaw ................ B32B 25/04
                                                474/263
(Continued)

FOREIGN PATENT DOCUMENTS

CN       1222959 A      7/1999
CN       101558251 A   10/2009
(Continued)

OTHER PUBLICATIONS

Translation of JP20102428825A (Year: 2010).*
(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

A V-ribbed belt in which a frictional power-transmission surface is formed from a weft knitted multilayer knitted fabric is provided, in which the weft knitted multilayer knitted fabric contains cellulose based natural spun yarn, polyester based composite yarn, and polyamide based yarn, and in that at least the cellulose based natural spun yarn and the polyamide based yarn are disposed in a layer on the frictional power-transmission surface side.

12 Claims, 6 Drawing Sheets

(51) Int. Cl.
  *B32B 25/04* (2006.01)
  *B32B 25/10* (2006.01)
  *B32B 37/16* (2006.01)
  *D04B 1/10* (2006.01)
  *D04B 1/12* (2006.01)
  *F16G 5/06* (2006.01)
  *F16G 5/08* (2006.01)
  *F16G 5/20* (2006.01)
  *F16G 5/22* (2006.01)

(52) U.S. Cl.
  CPC .............. *B32B 25/10* (2013.01); *B32B 37/16* (2013.01); *D04B 1/102* (2013.01); *D04B 1/12* (2013.01); *F16G 5/06* (2013.01); *F16G 5/08* (2013.01); *F16G 5/22* (2013.01); *B32B 2250/02* (2013.01); *B32B 2262/0261* (2013.01); *B32B 2262/0284* (2013.01); *B32B 2262/062* (2013.01); *B32B 2262/12* (2013.01); *B32B 2305/77* (2013.01); *B32B 2317/10* (2013.01); *B32B 2367/00* (2013.01); *B32B 2377/00* (2013.01); *B32B 2433/04* (2013.01); *B32B 2605/08* (2013.01); *D10B 2201/02* (2013.01); *D10B 2331/02* (2013.01); *D10B 2331/04* (2013.01)

(56) References Cited

U.S. PATENT DOCUMENTS

| | | | |
|---|---|---|---|
| 6,086,500 | A | 7/2000 | Yamada et al. |
| 2007/0249451 | A1* | 10/2007 | Wu .................... F16G 1/28 474/263 |
| 2008/0108466 | A1 | 5/2008 | Pelton |
| 2010/0167860 | A1 | 7/2010 | Mori et al. |
| 2010/0173740 | A1 | 7/2010 | Mori et al. |
| 2010/0240482 | A1* | 9/2010 | Kanzow .................... F16G 5/08 474/237 |
| 2014/0135161 | A1 | 5/2014 | Mori et al. |
| 2014/0364262 | A1 | 12/2014 | Mori et al. |
| 2015/0087456 | A1 | 3/2015 | Baltes et al. |
| 2015/0369335 | A1* | 12/2015 | Ishiguro .................... C08L 7/00 474/260 |
| 2016/0053851 | A1* | 2/2016 | Kojima .................... F16G 5/08 474/265 |
| 2017/0284504 | A1 | 10/2017 | Mitsutomi et al. |
| 2021/0364061 | A1* | 11/2021 | Bier .................... F16G 5/08 |

FOREIGN PATENT DOCUMENTS

| | | |
|---|---|---|
| EP | 0099205 A1 | 1/1984 |
| JP | H03-033536 A | 2/1991 |
| JP | 2009-533609 A | 9/2009 |
| JP | 2010-053935 A | 3/2010 |
| JP | 2010-242825 A | 10/2010 |
| JP | 2014-209028 A | 11/2014 |
| JP | 2016-070494 A | 5/2016 |
| JP | 2016-205625 A | 12/2016 |
| WO | 2007-117690 A1 | 10/2007 |

OTHER PUBLICATIONS

May 8, 2019—(TW) Office Action—App 107117774.
Jan. 29, 2019—(TW) Office Action—App 107117774.
Aug. 14, 2018—International Search Report—Intl App PCT/JP2018/019874.
Mar. 31, 2021—(CA) Office Action—App 3,064,366.
Jun. 15, 2021—(CN) Notification of Second Office Action—App 201880033319.0, Eng Tran.
Nov. 19, 2020—(KR) Office Action—App 10-2019-7034408, Eng Tran.
Nov. 20, 2020—(CN) Notification of First Office Action—App 201880033319.0, Eng Tran.
Jan. 22, 2021—(EP) Extended EP Search Report—App 18806498.4.
Mar. 24, 2020—(JP) Office Action—App 2018-097341, Eng Tran.

* cited by examiner (A) Example of uniform distribution

Cellulose-based natural spun yarn

Polyamide-based yarn

Cellulose-based natural spun yarn

Polyamide-based yarn

Cellulose-based natural spun yarn

Polyamide-based yarn (B) Example of non-uniform distribution

Cellulose-based natural spun yarn

Polyamide-based yarn

V-RIBBED BELT AND MANUFACTURING METHOD FOR SAME

CROSS REFERENCE TO RELATED APPLICATIONS

This is a U.S. National Phase Application under 35 U.S.C. § 371 of International Application No. PCT/JP2018/019874, filed May 23, 2018, which claims priority to Japanese Application Nos. 2017-102797, filed May 24, 2017 and 2018-097341, filed May 21, 2018, which was published Under PCT Article 21(2), the entire contents of which are incorporated herein by reference.

TECHNICAL FIELD

The present invention relates to a V-ribbed belt whose frictional power-transmission surface is covered with a knitted cloth, and manufacturing method thereof.

BACKGROUND ART

Belts for transmitting motive power are employed broadly for the motive power transmission for driving of accessories such as an air compressor and an alternator of an automobile. In recent years, there has been strict requirements relating silence. In particular, in automobile drive devices, sounds other than an engine sound are regarded as noises. Thus, it has come to be required to take countermeasures against sounds generated by belts.

Cause of sound generated by a belt include a slip sound that is generated by a slip between the belt and a pulley due to a large variation of the belt speed or a heavy load condition. In particular, in the case of a driving in the rain or the like, water enters inside an engine room and is stuck between a belt and a pulley, whereby the friction coefficient of the belt decreases to possibly cause frequent generation of a slip sound.

For the above problem, a countermeasure in which a frictional power-transmission surface of a belt is covered with a knitted cloth formed by fiber has been known. For example, in Patent document 1, to decrease the difference of friction coefficients of a belt between a dry state and a wet state, a knitted cloth is formed using bulk textured polyester-based composite yarn and cellulose-based natural spun yarn, and the cellulose-based natural spun yarn which is superior in water absorbability absorbs water quickly, whereby lowering of the friction coefficient in a wet state is suppressed and the resistance to sound generation with water is increased.

CITATION LIST

Patent Literature

Patent document 1: JP-A-2014-209028

SUMMARY OF INVENTION

Technical Problem

However, since the cellulose-based natural spun yarn is low in wear resistance, the cellulose-based natural spun yarn is worn as it is used and suffers lowering of its water absorbability and the friction coefficient in a wet state lowers, whereby there is some possibility that necessary resistance to sound generation with water cannot be maintained for a sufficiently long time.

In view of the above, in order to make it possible to maintain necessary resistance to sound generation with water for a long time, an object of the present invention is to provide a V-ribbed belt whose frictional power-transmission surface is covered with a knitted cloth that is superior in wear resistance, and provide a manufacturing method thereof.

Solution to Problem

To attain the above problem, the present invention provides a V-ribbed belt having a frictional power-transmission surface constituted by a multilayer weft-knitted cloth, in which:

the multilayer weft-knitted cloth includes a cellulose-based natural spun yarn, a polyester-based composite yarn, and a polyamide-based yarn; and at least the cellulose-based natural spun yarn and the polyamide-based yarn are disposed in a layer on a frictional power-transmission surface side.

Since the multilayer weft-knitted cloth which covers the frictional power-transmission surface side includes the cellulose-based natural spun yarn, the water absorbability and the resistance to sound generation with water of the V-ribbed belt can be increased. Since the multilayer weft-knitted cloth includes the polyester-based composite yarn, the elasticity of the multilayer weft-knitted cloth can be increased, and the adaptability of the multilayer weft-knitted cloth to V-shaped rib portions during forming the V-shaped rib portions in the belt using mold can be increased. Furthermore, since the multilayer weft-knitted cloth includes the polyamide-based yarn, the wear resistance can be increased and wear of the cellulose-based natural spun yarn can be suppressed, whereby the resistance to sound generation with water can be maintained for a long time.

Since the elasticity of the knitted cloth is increased by employing weft-knitting in the knitted cloth which covers the frictional power-transmission surface, it is possible to make the rib portions not prone to suffer a shape failure in a manufacturing process of the V-ribbed belt in which the V-shaped rib portions are formed in the belt using mold. Furthermore, since the knitted cloth has a multilayer structure, seeping-out of rubber which is a component of the V-ribbed belt to the frictional power-transmission surface side through the knitted cloth is suppressed, whereby the difference between a friction coefficient in a dry state and a friction coefficient in a wet state of the frictional power-transmission surface can be made small and hence the resistance to sound generation with water can be increased.

Since the cellulose-based natural spun yarn which is high in water absorbability is provided in the frictional power-transmission surface-side layer of the V-ribbed belt, water that has entered between the V-ribbed belt and a pulley can be absorbed quickly and the friction coefficient can be stabilized (i.e., reduction of the friction coefficient in a wet state can be suppressed), whereby the resistance to sound generation with water can be increased. Furthermore, since the polyamide-based yarn which is high in wear resistance is provided in the frictional power-transmission surface-side layer, wear of the cellulose-based natural spun yarn can be suppressed, whereby the resistance to sound generation with water can be maintained for a long time.

In the present invention, in the above-described multilayer weft-knitted cloth of the above V-ribbed belt, a content of the polyamide-based yarn may be 5 to 60 mass %.

With the above configuration, the wear resistance of the V-ribbed belt can be increased without impairing its resistance to sound generation with water. When the content of the polyamide-based yarn is smaller than 5 mass %, the wear resistance may lower. When the content of the polyamide-based yarn is larger than 60 mass %, the water absorbability and the resistance to sound generation with water may lower. In the multilayer weft-knitted cloth, the content of the polyamide-based yarn is preferably 15 to 60 mass %, even preferably 20 to 55 mass %, and further preferably 20 to 40%.

In the present invention, in the above-described multilayer weft-knitted cloth of the above V-ribbed belt, a content of the cellulose-based natural spun yarn may be 5 to 60 mass %.

With the above configuration, the wear resistance of the V-ribbed belt can be increased without impairing its resistance to sound generation with water. When the content of the cellulose-based natural spun yarn is smaller than 5 mass %, the water absorbability and the resistance to sound generation with water may lower. When the content of the cellulose-based natural spun yarn is larger than 60 mass %, the wear resistance may lower. In the multilayer weft-knitted cloth, the content of the cellulose-based natural spun yarn is preferably 5 to 55 mass %, even preferably 5 to 40 mass %, and further preferably 20 to 40 mass %.

In the present invention, in the above-described multilayer weft-knitted cloth of the above V-ribbed belt, a mass ratio between the polyamide-based yarn and the cellulose-based natural spun yarn may satisfy a relation of (polyamide-based yarn):(cellulose-based natural spun yarn)=5:95 to 95:5.

With the above configuration, the wear resistance of the V-ribbed belt can be increased without impairing its resistance to sound generation with water. The wear resistance lowers when the content ratio of the polyamide-based yarn is small. When the content ratio of the polyamide-based yarn is large, the water absorbability lowers, and hence the resistance to sound generation with water lowers. In the multilayer weft-knitted cloth, the mass ratio between the polyamide-based yarn and the cellulose-based natural spun yarn is preferably 10:90 to 90:10, even preferably 20:80 to 80:20, and further preferably 30:70 to 70:30.

In the present invention, in the above V-ribbed belt, the polyester-based composite yarn included in the multilayer weft-knitted cloth may be a bulk textured yarn including two or more kinds of polymers having different thermal shrinkage ratios from each other.

With the above configuration, waviness is obtained by the difference(s) in thermal shrinkage ratio of the two or more kinds of polymers, whereby the multilayer weft-knitted cloth can be imparted with elasticity and bulkiness. This makes it possible to increase the adaptability of the multilayer weft-knitted cloth to the V-shaped rib portions in a manufacturing process of the V-ribbed belt in which V-shaped rib portions are formed in the belt using mold. Furthermore, since seeping-out of rubber which is a component of the V-ribbed belt to the frictional power-transmission surface side through the knitted cloth can be suppressed, the difference between the friction coefficient in a dry state and the friction coefficient in a wet state of the frictional power-transmission surface can be made small. Thus, the resistance to sound generation with water can be increased.

In the present invention, in the above V-ribbed belt, the polyester-based composite yarn included in the multilayer weft-knitted cloth may be a conjugate yarn including a polyethylene terephthalate (PET).

The elasticity, bulkiness, and wear resistance of the multilayer weft-knitted cloth can be increased by using conjugate yarn including polyethylene terephthalate (PET) in the polyester-based composite yarn that is included in the multilayer weft-knitted cloth. Furthermore, since the conjugate yarn including polyethylene terephthalate can be acquired easily, the cost can be reduced.

In the present invention, in the above V-ribbed belt, the polyamide-based yarn included in the multilayer weft-knitted cloth may include a nylon or an aramid fiber.

Since a multilayer weft-knitted cloth including nylon or aramid fiber is high in wear resistance, it is high in an effect of suppressing wear of the cellulose-based natural spun yarn and hence makes it possible to maintain the resistance to sound generation with water for a long time.

In the present invention, in the above V-ribbed belt, each of yarns constituting the multilayer weft-knitted cloth may have filaments or fibers twisted together.

In the case where filaments or fibers are bundled in yarns that constitute the multilayer weft-knitted cloth, the wear resistance is increased. Also, in the case where filaments or fibers are bundled, by twisting them together, in yarns that constitute the multilayer weft-knitted cloth, the knitted cloth can be formed easily and the filaments or fibers can be prevented from fluffing, whereby the appearance quality of the V-ribbed belt can be improved.

In the present invention, in the above V-ribbed belt, the multilayer weft-knitted cloth may not include a polyurethane.

Since the multilayer weft-knitted cloth does not include polyurethane which is lower in water absorbability and wear resistance than fiber materials, the multilayer weft-knitted cloth can be prevented from lowering in water absorbability and wear resistance.

Although the above configuration seems low in elasticity because it does not contain polyurethane which is employed in knitted cloth frequently, necessary elasticity can be secured because the above configuration includes the polyester-based composite yarn which is superior in elasticity.

In the present invention, in the above V-ribbed belt, a thickness of the multilayer weft-knitted cloth covering the frictional power-transmission surface may be 0.6 mm or larger.

Since the thickness of the multilayer weft-knitted cloth is larger than or equal to 0.6 mm, seeping-out of rubber which is a component of the V-ribbed belt to the frictional power-transmission surface side through the knitted cloth is suppressed and hence the difference between a friction coefficient in a dry state and a friction coefficient in a wet state of the frictional power-transmission surface can be made small, whereby the resistance to sound generation with water can be increased. When the thickness of the multilayer weft-knitted cloth is larger than or equal to 0.7 mm, seeping-out of rubber which is a component of the V-ribbed belt to the frictional power-transmission surface side through the knitted cloth is suppressed more reliably; the thickness of the multilayer weft-knitted cloth is particularly preferably larger than or equal to 0.8 mm Although there are no particular limitations on the upper limit of the thickness of the multilayer weft-knitted cloth, the thickness of the multilayer weft-knitted cloth may be smaller than or equal to 1.5 mm, for example.

In the present invention, the cellulose-based natural spun yarn and the polyamide-based yarn may be arranged so as to be distributed uniformly in the layer on the frictional power-transmission surface side of the multilayer weft-knitted cloth.

Since the cellulose-based natural spun yarn and the polyamide-based yarn are arranged so as to be distributed uniformly, polyamide-based yarns exist closer to a cellulose-based natural spun yarn than in a case that several yarns are arranged together. Thus, the wear of the cellulose-based natural spun yarn can be suppressed more reliably. Furthermore, the resistance to sound generation with water can be increased because the water absorbability is free of unevenness.

In the present invention, the V-ribbed belt may include a rubber as a component, in which:
  the frictional power-transmission surface side of the rubber may be covered with the multilayer weft-knitted cloth; and
  the rubber may not seep out from the multilayer weft-knitted cloth to the frictional power-transmission surface.

In the case where the rubber seeps out from the multilayer weft-knitted cloth to the frictional power-transmission surface, the water absorbability lowers and hence the friction coefficient in a wet state lowers to a large extent, resulting in lowering of the resistance to sound generation with water. Thus, by preventing seeping-out of the rubber from the multilayer weft-knitted cloth to the frictional power-transmission surface, sufficient water absorbability can be secured and hence the resistance to sound generation with water can be increased. The sentence "seeping-out of rubber is prevented" means that the area ratio of a portion where rubber is exposed to the frictional power-transmission surface is smaller than 5%.

The present invention also provides a manufacturing method of the V-ribbed belt which may include:
  covering an unvulcanized compression layer sheet with a cylindrical multilayer weft-knitted cloth in which two ends of the multilayer weft-knitted cloth are joined to each other; or
  jointing the two ends of the multilayer weft-knitted cloth to each other on an unvulcanized compression layer sheet.

In the case of covering a compression layer sheet with a cylindrical, seamless (i.e., having no joining portions) multilayer weft-knitted cloth, it is necessary to prepare a multilayer weft-knitted cloth having a circumferential length corresponding to a belt length. Thus, to accommodate to various belt lengths, it is necessary to stock many in-process items. In contrast, in the above method in which the both ends of the multilayer weft-knitted cloth are joined together, the circumferential length of the multilayer weft-knitted cloth can be adjusted instantly according to a belt length and hence it is not necessary to stock many in-process items.

Advantageous Effects of Invention

A V-ribbed belt capable of maintaining necessary resistance to sound generation with water for a long time as well as manufacturing method thereof can be provided by covering the frictional power-transmission surface of the V-ribbed belt with a knitted cloth that is superior in wear resistance.

DESCRIPTION OF EMBODIMENTS

Figure 1:
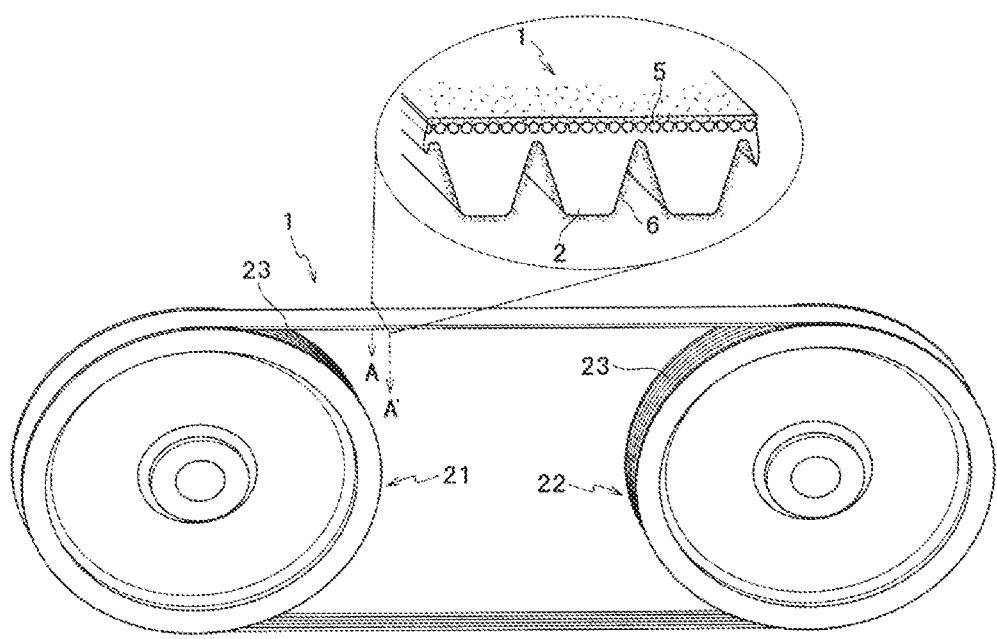
FIG. 1 is a schematic perspective view for description of an example of a belt power-transmission device which uses a V-ribbed belt according to the present invention.

An example of embodiment of the present invention will be hereinafter described with reference to the drawings. FIG. 1 shows an example of a belt power-transmission device for driving accessary which uses a V-ribbed belt 1 according to the present invention. This belt power-transmission device is a simplest example in which one drive pulley 21 and one driven pulley 22 are included and the V-ribbed belt 1 is stretched between the drive pulley 21 and the driven pulley 22. The inner circumferential surface of the endless V-ribbed belt 1 is formed with plural V-shaped rib portions 2 which extend in the belt circumferential length direction and the outer circumferential surface of each of the drive pulley 21 and the driven pulley 22 is formed with plural V-shape grooves 23 to be fitted with the respective rib portions 2 of the V-ribbed belt 1.

(Configuration of V-Ribbed Belt 1)

Figure 2:
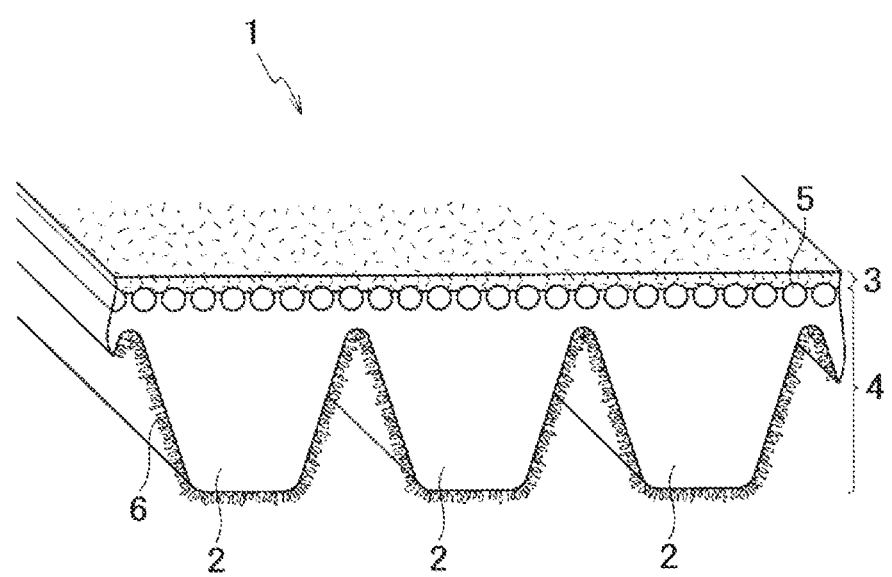
FIG. 2 is a cross-sectional view of the V-ribbed belt taken along the section A-A' in FIG. 1.

As shown in FIG. 2, the V-ribbed belt 1 includes a tension layer 3 which forms a belt back surface on outer circumference side, a compression layer 4 which is provided on the inner circumference side of the tension layer 3, and core wires 5 which are buried between the tension layer 3 and the compression layer 4 and extend in the belt circumferential length direction. The compression layer 4 is formed with the plural V-shaped rib portions 2 which extend in the belt circumferential length direction. The surfaces of the rib portions 2 to serve as frictional power-transmission surfaces are covered with a knitted cloth 6. As described later, each of the tension layer 3 and the compression layer 4 is made of a rubber composition. As necessary, an adhesive layer may be provided between the tension layer 3 and the compression layer 4. The adhesive layer is provided for the purpose of increasing the adhesion between the core wires 5 and each of the tension layer 3 and the compression layer 4 and is not indispensable. The adhesive layer may be provided either in such a manner that the core wires 5 are fully buried in the adhesive layer or in such a manner that the core wires 5 are buried between the adhesive layer and the tension layer 3 or between the adhesive layer and the compression layer 4.

Examples of the rubber component of the rubber composition forming the compression layer 4 include rubbers capable of vulcanization or crosslinking, such as diene-based rubbers (e.g., natural rubber, isoprene rubber, butadiene rubber, chloroprene rubber, styrene-butadiene rubber, acrylonitrile-butadiene rubber, hydrogenated nitrile rubber, or a mixed polymer of hydrogenated nitrile rubber and a metal salt of unsaturated carboxylic acid), ethylene-α-olefin elastomer, chlorosulfonated polyethylene rubber, alkylated chlorosulfonated polyethylene rubber, epichlorohydrin rubber, acrylic rubber, silicone rubber, urethane rubber, and fluororubber.

Among the above rubbers, ones in which an unvulcanized rubber layer is formed with a rubber composition containing sulfur or an organic peroxide and the unvulcanized rubber layer is vulcanized or crosslinked are preferable. In particular, ethylene-α-olefin elastomer (ethylene-α-olefin-based rubber) is preferable because it contains no harmful halogens, is resistant to ozone, heat, and low temperature, and is highly economical. Examples of the ethylene-α-olefin elastomer include ethylene-α-olefin rubber (e.g., ethylene-propylene rubber) and ethylene-α-olefin diene rubber (e.g., ethylene-propylene-diene copolymer). Examples of α-olefin include propylene, butene, pentene, methyl pentene, hexene, and octene. These α-olefins can be used singly or as a combination of two or more kinds thereof. Examples of diene monomers which are materials of them include disconjugate diene-based monomers such as dicyclopentadiene, methylene norbornene, ethylidene norbornene, 1, 4-hexadiene, and cyclooctadiene. These diene monomers can be used singly or as a combination of two or more kinds thereof.

In ethylene-α-olefin elastomers, the preferable ratio (mass ratio of the former/the later) between ethylene and α-olefin is 40/60 to 90/10, preferably 45/55 to 85/15, and even preferably 55/45 to 80/20. The proportion of diene can be selected from a range of 4 to 15 mass %. The proportion of diene is, for example, 4.2 to 13 mass %, preferably 4.4 to 11.5 mass %. The iodine value of ethylene-α-olefin elastomer containing a diene component is, for example, 3 to 40, preferably 5 to 30, and even preferably 10 to 20. When the iodine value is too small, the vulcanization of a rubber composition become insufficient, whereby wear and sticking are prone to occur. When the iodine value is too large, the scorch time of a rubber composition becomes short, whereby the rubber composition becomes difficult to be handled and becomes prone to lower in heat resistance. As for a measurement method of an iodine value, it is measured by adding excessive iodine to a measurement sample to perform a complete reaction (reaction of iodine and unsaturated bonds) and determining the quantity of residual iodine by redox titration.

Examples of organic peroxide for crosslinking an unvulcanized rubber layer include diacylperoxide, peroxyester, and dialkylperoxide (e.g., dicumylperoxide, t-butylcumylperoxide, 1, 1-di-butylperoxy-3, 3, 5-trimetylcyclohexane, 2, 5-dimethyl-2, 5-di(t-butylperoxy)-hexane, 1, 3-bis(t-butylperoxy-isopropyl)benzene, or di-t-butylperoxide).

These organic peroxides can be used singly or as a combination of two or more kinds. Furthermore, preferable organic peroxides are ones whose temperature range at which the half-life for thermal decomposition is one minute is 150° C. to 250° C., preferably 175° C. to 225° C.

The preferred proportion of the vulcanizing agent or crosslinking agent (in particular, organic peroxide) for an unvulcanized rubber layer is, in terms of solid components, 1 to 10 parts by mass, preferably 1.2 to 8 parts by mass, and even preferably 1.5 to 6 parts by mass with respect to 100 parts by mass of the rubber component (e.g., ethylene-α-olefin elastomer).

The rubber composition may contain a vulcanization accelerator. Examples of the vulcanization accelerator include a thiuram-based accelerator, a thiazole-based accelerator, a sulfenamide-based accelerator, a bismaleimide-based accelerator, and a urea-based accelerator. These vulcanization accelerators can be used singly or as a combination of two or more kinds thereof. The preferred proportion of the vulcanization accelerator(s) (in the case of a combination of plural kinds thereof, this means the sum of their amount; this applies to the following description when plural kinds are combined together) is, in terms of solid components, 0.5 to 15 parts by mass, preferably 1 to 10 parts by mass, even preferably 2 to 5 parts by mass with respect to 100 parts by mass of the rubber component.

To increase the degree of crosslinking and prevent sticking wear or the like, the rubber composition may further contain a co-crosslinking agent (crosslinking aid or co-vulcanizing agent). Examples of the co-crosslinking agent include common crosslinking aids such as multifunctional (iso)cyanurate (e.g., triarllyl isocyanurate or triarllyl cyanurate), polydiene ((e.g., 1, 2-polybutadiene), a metal salt of unsaturated carboxylic acid (e.g., zinc (meth)acrylate and magnesium (meth)acrylate), oximes (e.g., quinonedioxime), guanidines (e.g., diphenylguanidine), multifunctional (meth)acrylate (e.g., ethylene glycol di (meth)acrylate, butanediol di (meth)acrylate, or trimethylolpropanetri (meth)acrylate), and bismaleimides (e.g., N, N'-m-phenylene bismaleimide). These crosslinking aids can be used singly or as a combination of two or more kinds thereof. The preferable proportion of the crosslinking aid is, in terms of solid components, 0.01 to 10 parts by mass, preferably 0.05 to 8 parts by mass with respect to 100 parts by mass of the rubber component.

As necessary, the rubber composition may contain staple fiber. Examples of staple fiber include cellulose-based fiber (e.g., cotton or rayon), polyester-based fiber (e.g., PET fiber or PEN fiber), aliphatic polyamide fiber (e.g., nylon 6 fiber, nylon 66 fiber, or nylon 46 fiber), aromatic polyamide fiber (e.g., p-aramid fiber or m-aramid fiber), vinylon fiber, and polyparaphenylene benzobisoxazole (PBO) fiber. To enhance their dispersibility and adhesiveness in the rubber composition, these kinds of staple fiber may be subjected to common bonding treatment or surface treatment, such as a treatment using an RFL liquid. The preferable proportion of the staple fiber is 1 to 50 parts by mass, preferably 5 to 40 parts by mass, and even preferably 10 to 35 parts by mass with respect to 100 parts by mass of the rubber component.

As necessary, the rubber composition may further contain common additives such as a vulcanization aid, a vulcanization retarder, a reinforcing agent (e.g., carbon black or silicon oxide such as hydrated silica), a filler (e.g., clay, calcium carbonate, talc, or mica), a metal oxide (e.g., zinc oxide, magnesium oxide, calcium oxide, barium oxide, iron oxide, copper oxide, titanium oxide, or aluminum oxide), a plasticizer (e.g., oils such as paraffin-based oil, naphthene-based oil, and process oil), a processing agent or processing aid (e.g., stearic acid, metal stearate, wax, paraffin, or fatty acid amide), an anti-aging agent (e.g., antioxidant, thermal anti-aging agent, anti-flex cracking agent, or antiozonant), a colorant, a tackifier, a coupling agent (e.g., silane coupling agent), a stabilizer (e.g., ultraviolet absorber, antioxidant, antiozonant, or thermostabilizer), a lubricant (e.g., graphite, molybdenum disulfide, or ultrahigh molecular weight polyethylene), a flame retardant, or an antistatic agent. The metal oxide may act as a crosslinking agent. These additives can be used singly or as a combination of two or more kinds thereof. The proportion of each of these additives can be selected from a common range according to their kinds. For example, with respect to 100 parts by mass of the rubber component, the preferable proportion of the reinforcing agent (e.g., carbon black or silica) is 10 to 200 parts by mass (preferably 20 to 150 parts by mass), the preferable proportion of the metal oxide (e.g., zinc oxide) is 1 to 15 parts by mass (preferably 2 to 10 parts by mass), the preferable proportion of the plasticizer (e.g., oils such as paraffin oil) is 1 to 30 parts by mass (preferably 5 to 25 parts by mass), and the preferable proportion of the processing agent (e.g., stearic acid) is 0.1 to 5 parts by mass (preferably 0.5 to 3 parts by mass).

The tension layer 3 may be formed with either a rubber composition (e.g., a rubber composition containing a rubber component such as ethylene-α-olefin elastomer) that is the same as the rubber composition of the compression layer 4, or a cloth (reinforcing cloth) such as canvas. Examples of the reinforcing cloth include cloth materials such as woven fabric, wide angle canvas, knitted cloth, and nonwoven fabric. Among these cloth materials, woven fabric that is woven in the form of a plain weave, a twill weave, or a satin weave, wide angle canvas in which the crossing angle of the warp and weft is approximately in a range of 90° to 130°, and knitted cloth are preferable. The fiber that constitutes the reinforcing cloth may be fiber that is the same as the above-described staple fiber. The reinforcing cloth may be processed into a rubber-attached canvas by treating a reinforcing cloth using an RFL liquid (e.g., immersion treatment) and subjecting the resulting cloth to coating treatment or the like.

It is preferable that the tension layer 3 is formed with a rubber composition that is the same as the rubber composition of the compression layer 4. In many cases, a rubber component of this rubber composition is a rubber that is of the same type or the same kind as the rubber component of the compression layer 4. The proportions of additives such as a vulcanizing agent or crosslinking agent, a co-crosslinking agent, and a vulcanization accelerator can be selected from ranges that are the same as the ranges employed in the rubber composition of the compression layer 4.

To suppress generation of a noise due to sticking of back-surface rubber during back-side driving, the rubber composition of the tension layer 3 may contain staple fiber that is the same as the staple fiber employed in the compression layer 4. The staple fiber may be either in straight form or in partially bent form (e.g., milled fiber disclosed in JP-A-2007-120507). During running of the V-ribbed belt 1, a crack may develop in the belt circumferential direction in the tension layer 3 to cause the V-ribbed belt 1 to be broken into loops. This can be prevented by arranging staple fibers in the belt width direction or random directions. To suppress generation of a noise during back-side driving, the surface of the tension layer 3 (belt back surface) may be formed with a concave and convex pattern. Examples of the concave and convex pattern include a knitted cloth pattern, a woven fabric pattern, a tire woven fabric pattern, and an emboss pattern (e.g., a form having dimples). There are no particular limitations on the size and depth of the concave and convex pattern.

There are no particular limitations on the core wires 5. The core wires 5 may be cords made of polyester fiber (e.g., polybutylene terephthalate fiber, polyethylene terephthalate fiber, polytrimethylene terephthalate fiber, or polyethylene naphthalate fiber), aliphatic polyamide (nylon) fiber (e.g., nylon 6 fiber, nylon 66 fiber, or nylon 46 fiber), aromatic polyamide (aramid) fiber (e.g., copolyparaphenylene•3, 4' oxydiphenylene•terephthalamide fiber, or poly-p-phenylene terephthalamide fiber), polyarylate fiber, glass fiber, carbon fiber, or PBO fiber. These kinds of fiber can be used singly or as a combination of two or more kinds thereof. From these fibers, selection can be made as appropriate according to the expansion coefficient of a flexible jacket 51 described later. For example, in the case of such high expansion that the expansion coefficient is larger than 2%, it is preferable to employ polyester fiber (in particular, low-elasticity polybutylene terephthalate fiber) or nylon fiber (in particular, nylon 66 fiber or nylon 46 fiber) which are small in elastic modulus. This is because in the case of fiber having a large elastic modulus such as aramid fiber or PBO fiber, the fiber cannot expand sufficiently even when the flexible jacket 51 expands to cause a problem that the pitch line of the core wires 5 buried in the V-ribbed belt 1 is made unstable or the rib portions 2 are not given a proper shape. Thus, where fiber having a large elastic modulus is employed, it is preferable to set the expansion coefficient of the flexible jacket 51 small (e.g., at about 1%).

Since the knitted cloth 6 employs weft-knitting which provides high elasticity, it can easily conform to the frictional power-transmission surface which are formed with projections and recesses in the rib portions 2 (a shape failure is not prone to occur in the rib portions 2). Furthermore, the knitted cloth 6 employs multilayer knitting because it can provide a large thickness and high water absorbability, can prevent seeping-out of a rubber component of the compression layer 4 more reliably, and makes it possible to provide a desired characteristic by setting different yarn exposure ratios to the frictional power-transmission surface side and the compression layer 4 side each. Examples of the knitted cloth 6 that employs multilayer weft-knitting include ones formed by smooth knitting, interlock knitting, double rib knitting, single pique knitting, punch Rome knitting, Milan rib knitting, double jersey knitting, and moss stich (front, back, or double-sided).

The knitted cloth 6 is knitted so as to include polyester-based composite yarn, cellulose-based natural spun yarn (e.g., cotton yarn), and polyamide-based yarn. The knitted cloth 6 is knitted in plural layers such that at least cellulose-based natural spun yarn and polyamide-based yarn are disposed in the frictional power-transmission surface-side layer (i.e., on the side of the surface to come into contact with the drive pulley 21 and the driven pulley 22). That is, polyester-based composite yarn is not indispensable in the frictional power-transmission surface-side layer of the knitted cloth 6. The knitted cloth 6 may further include fiber other than polyester-based composite yarn, cellulose-based natural spun yarn, and polyamide-based yarn. It is preferable that the total content of the polyester-based composite yarn, the cellulose-based natural spun yarn, and the polyamide-based yarn is larger than or equal to 80 mass %. It is preferable that the total content of the cellulose-based natural spun yarn and the polyamide-based yarn in the frictional power-transmission surface-side layer of the knitted cloth 6 is larger than or equal to 70 mass %.

In the present embodiment, the polyester-based composite yarn is bulk textured yarn. Bulk textured yarn is a processed yarn that is made bulky in cross section by making the fiber wavy (i.e., giving it waviness) or covering core yarn with other yarn. Examples of bulk textured yarn include conjugate yarn, covering yarn, crimped yarn, woolly finished yarn, taslan finished yarn, and interlaced yarn. Among them, conjugate yarn or covering yarn are preferable for the polyester-based composite yarn which is bulk textured yarn.

It is preferable that the conjugate yarn has a sectional structure where two or more kinds of polymers that are different from each other in thermal shrinkage ratio are combined to each other in the fiber axis direction. When receiving heat during manufacturing or processing, a conjugate yarn having such a structure becomes bulky yarn because it crimps due to the differences between the shrinkage ratios (thermal shrinkage ratios) of the respective polymers. Examples of conjugate yarn include composite yarn in which polytrimethylene terephthalate (PTT) and polyethylene terephthalate (PET) are conjugated (PTT/PET conjugate yarn) and composite yarn in which polybutylene terephthalate (PBT) and polyethylene terephthalate (PET) are conjugated (PBT/PET conjugate yarn). By using conjugate yarn including polyethylene terephthalate (PET) as the polyester-based composite yarn as described above, the elasticity, bulkiness, and wear resistance of the knitted cloth 6 can be enhanced. The use of conjugate yarn including polyethylene terephthalate enables cost reduction because it can be acquired easily. Covering yarn is yarn in which a cross section of overall yarn is made bulky by surrounding (covering) a periphery of core yarn with other yarn. Examples of the covering yarn include composite yarn in which polyurethane (PU) yarn which is superior in elasticity is used as core yarn and its surface is covered with polyethylene terephthalate (PET) (PET/PU covering yarn) and composite yarn in which PU is used as core yarn and is covered with polyamide (PA) (PA/PU covering yarn). Among the above kinds of composite yarn, use of PTT/PET conjugate yarn which is superior in elasticity and wear resistance is preferable.

As described above, by constituting the polyester-based composite yarn with bulk textured yarn consisting of two or more kinds of polymers that are different from each other in thermal shrinkage ratio, waviness is obtained because of the difference in thermal shrinkage ratio between the two or more kinds of polymers, whereby the knitted cloth 6 can be given elasticity and wear resistance. As a result, in a manufacturing process for forming the V-shaped rib portions 2 in the V-ribbed belt 1 using molds (inside mold 52 and an outside mold 53) described later, the adaptability of the knitted cloth 6 to the V-shaped rib portions 2 can be increased. Furthermore, seeping-out of the rubber component of the compression layer 4 to the frictional power-transmission surface side through the knitted cloth 6 can be suppressed and hence the difference between the friction coefficient in a dry state and friction coefficient in a wet state of the frictional power-transmission surface can be made small, whereby the resistance to sound generation with water can be increased.

Examples of the cellulose-based natural spun yarn include various kinds of yarn produced by spinning natural-plant-origin cellulose fiber (pulp fiber) such as bamboo fiber, sugar cane fiber, seed hair fiber (e.g., cotton fiber (cotton linter) or kapok), jin skin fiber (e.g., hemp, paper mulberry, or paper bush), or leaf fiber (e.g., Manila hemp or New Zealand hemp); animal-origin cellulose fiber such as wool, silk, or ascidian cellulose; bacteria cellulose fiber; algae cellulose; or the like. Among these kinds of cellulose-based natural spun yarn, cotton fiber is preferable because it is particularly high in water absorbability.

In the knitted cloth 6, when the content of the cellulose-based natural spun yarn is smaller than 5 mass %, the water absorbability become low and hence resistance to sound generation with water may be reduced. When the content of the cellulose-based natural spun yarn is larger than 60 mass %, the wear resistance of the knitted cloth 6 may become low. Accordingly, in the present embodiment, the content of the cellulose-based natural spun yarn is set in a range of 5 to 60 mass %. In the knitted cloth 6, the content of the cellulose-based natural spun yarn is preferably 5 to 55 mass %, even preferably 5 to 40 mass %, and further preferably 20 to 40 mass %. By setting the content of the cellulose-based natural spun yarn in the above range, the wear resistance of the V-ribbed belt 1 can be increased without impairing its resistance to sound generation with water.

Examples of the material of the polyamide-based yarn include aliphatic polyamide (nylon) and aromatic polyamide (aramid). Although higher wear resistance can be obtained by using aromatic polyamide (aramid), the wear resistance can be increased even by using nylon which is relatively inexpensive. The polyamide-based yarn may be either filament yarn that is a bundle of long fibers, or spun yarn (spun yarn) obtained by spinning staple fibers (staple). The filament yarn may be either an untwisted bundle in which filaments are paralleled, or twisted yarn in which paralleled filaments are twisted. Twisted yarn is preferable from the viewpoints of increasing the wear resistance and working efficiency of knitting.

In the knitted cloth 6, when the content of the polyamide-based yarn is smaller than 5 mass %, the wear resistance may become low. When the content of the polyamide-based yarn is larger than 60 mass %, the water absorbability of the knitted cloth 6 become low and hence its resistance to sound generation with water may be reduced. Thus, in the present embodiment, the content of the polyamide-based yarn is set in a range of 5 to 60 mass %. In the knitted cloth 6, the content of the polyamide-based yarn is preferably 15 to 60 mass %, even preferably 20 to 55 mass %, and further preferably 20 to 40 mass %. By setting the content of the polyamide-based yarn in the above range, the wear resistance of the V-ribbed belt 1 can be increased without impairing its resistance to sound generation with water.

Furthermore, in the knitted cloth 6 of the present embodiment, the mass ratio between the polyamide-based yarn and the cellulose-based natural spun yarn is set in a range of 5:95 to 95:5. This is because the wear resistance may lower when the content ratio of the polyamide-based yarn is smaller than the above range, and the water absorbability and hence the resistance to sound generation with water may lower when the content ratio of the polyamide-based yarn is larger than the above range. In the knitted cloth 6, the mass ratio between the polyamide-based yarn and the cellulose-based natural spun yarn is preferably in a range of 10:90 to 90:10, even preferably in a range of 20:80 to 80:20, and further preferably in a range of 30:70 to 70:30. By setting the mass ratio in the above range, the wear resistance of the V-ribbed belt 1 can be increased without impairing its resistance to sound generation with water.

In the knitted cloth 6, it is preferable that the cellulose-based natural spun yarn and the polyamide-based yarn is arranged so as to be distributed uniformly. In the present embodiment, the frictional power-transmission surface-side layer (i.e., on the side of the surface to come into contact with the drive pulley 21 and the driven pulley 22) of the multi-layered knitted cloth 6 includes at least both of the cellulose-based natural spun yarn and the polyamide-based yarn, and hence the wear of the cellulose-based natural spun yarn is suppressed, which provides an advantage that necessary resistance to sound generation with water can be kept for a long time. This advantage is more remarkable in the case where polyamide-based yarns are located (i.e., distributed uniformly) in the vicinities of cellulose-based natural spun yarns (A). For example, where the ratio ((the number of polyamide-based yarns):(the number of cellulose-based natural spun yarns)) is 1:1, it is desirable that knitting is performed in such a manner that polyamide-based yarns and cellulose-based natural spun yarns are arranged alternately. On the other hand, where knitting is performed in such a manner that unit of 10 polyamide-based yarns and unit of 10 cellulose-based natural spun yarns adjoin each other, cellulose-based natural spun yarns that are far from polyamide-based yarns are prone to wear and hence the resistance to sound generation with water is prone to lower.

Figure 3:
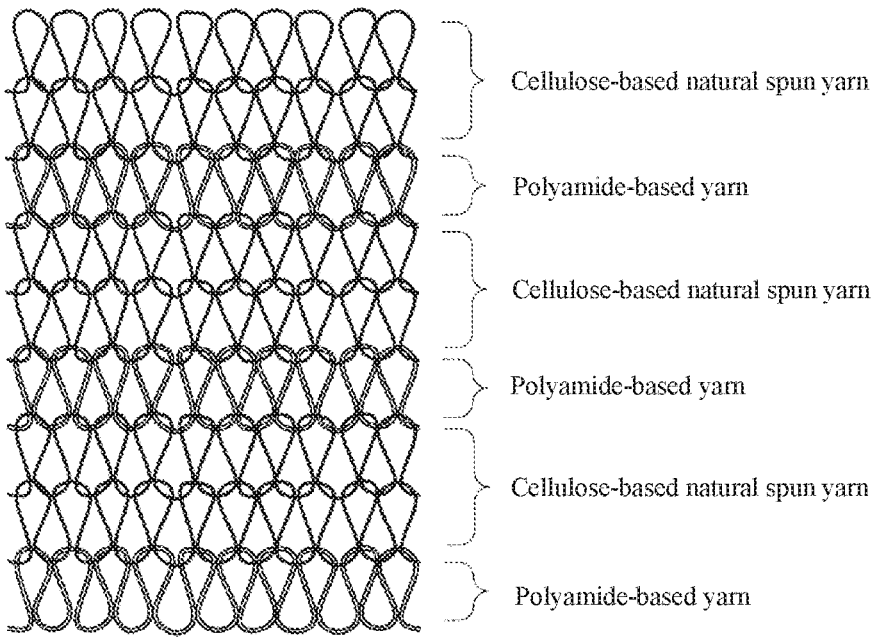
FIG. 3 is an explanatory diagram illustrating an example (part (A)) in which cellulose-based natural spun yarns and polyamide-based yarns are distributed uniformly, and an example (part (B)) in which they are not distributed uniformly.
Figure 3:
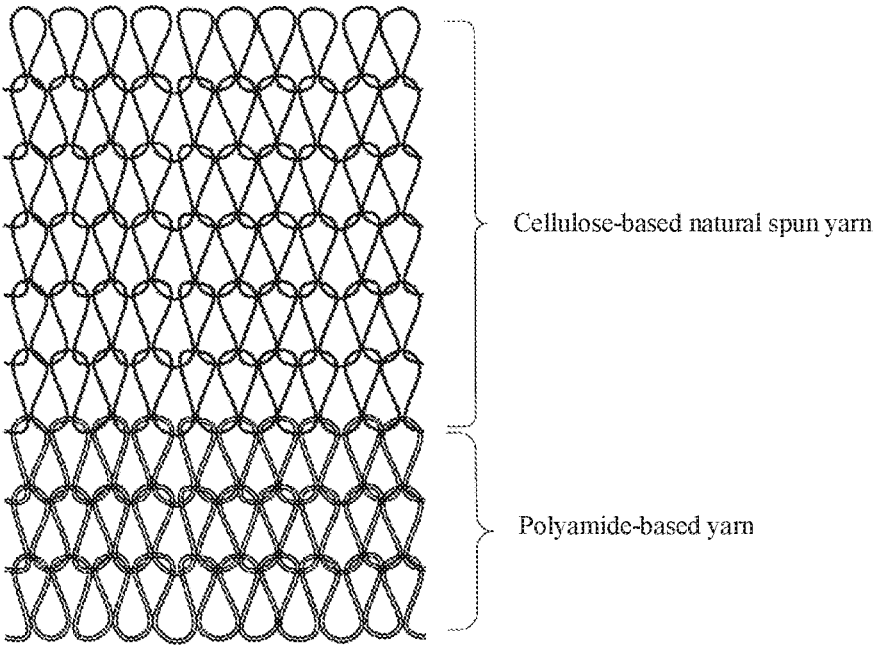

More specifically, where the mass ratios of the cellulose-based natural spun yarn and the polyamide-based yarn to the mass of the entire knitted cloth is 40% and 20%, respectively, and their unit weights are the same, one polyamide-based yarn is knitted for two cellulose-based natural spun yarns. In this case, when a knitting machine having 24 feeders is used, polyamide-based yarns are located in the vicinities of cellulose-based natural spun yarns and hence the wear of cellulose-based natural spun yarns can be suppressed more reliably in the case where eight sets of two feeders for a cellulose-based natural spun yarn and one feeder for a polyamide-based yarn are arranged repeatedly (see part (A) of FIG. 3) rather than 16 feeders for a cellulose-based natural spun yarn are arranged together and eight feeders for a polyamide-based yarn are arranged together (see part (B) of FIG. 3). Furthermore, since the water absorbability is free of unevenness, the resistance to sound generation with water can be increased. In this description body and the claims, the sentence "cellulose-based natural spun yarns and polyamide-based yarns are distributed uniformly" means that 12 adjacent yarns include at least one polyamide-based yarn.

It is preferable that each of the polyester-based composite yarn, the cellulose-based natural spun yarn, and the polyamide-based yarn that constitute the knitted cloth 6 is twisted yarn produced by twisting filaments or fibers together. By bundling filaments or fibers in yarns that constitute the knitted cloth 6, the wear resistance is increased. Where filaments or fibers are twisted together and bundled in yarns that constitute the knitted cloth 6, a knitted cloth can be formed easily and filaments or fibers can be prevented from fluffing, whereby the appearance quality of the V-ribbed belt 1 can be improved.

It is preferable that the knitted cloth 6 does not include polyurethane. In the case where the knitted cloth 6 does not include polyurethane which is lower in water absorbability and wear resistance than fiber materials, the knitted cloth 6 is prevented from being reduced in water absorbability and wear resistance. Since the knitted cloth 6 does not include polyurethane yarn or the like which is commonly employed in knitted cloth 6, it might seem that the knitted cloth 6 is low in elasticity. However, since the knitted cloth 6 includes polyester-based composite yarn which is high in elasticity, necessary elasticity can be secured. Furthermore, the knitted cloth 6 may include fiber other than polyester-based composite yarn, cellulose-based natural spun yarn, and polyamide-based yarn. It is preferable that the total content of the polyester-based composite yarn, the cellulose-based natural spun yarn, and the polyamide-based yarn in the knitted cloth 6 is larger than or equal to 80 mass %. Furthermore, it is preferable that the total content of the cellulose-based natural spun yarn and the polyamide-based yarn in the frictional power-transmission surface-side layer of the knitted cloth 6 is larger than or equal to 70 mass %.

It is preferable that the thickness of the knitted cloth 6 which includes bulk textured yarn and is knitted into multiple layers is larger than or equal to 0.6 mm By setting the thickness of the knitted cloth 6 larger than or equal to 0.6 mm, seeping-out of a rubber component of the compression layer 4 to the frictional power-transmission surface side through the knitted cloth 6 is suppressed and hence the difference between a friction coefficient in a dry state and a friction coefficient in a wet state of the frictional power-transmission surface can be made small, whereby the resistance to sound generation with water can be increased.

When the thickness of the knitted cloth 6 is larger than or equal to 0.7 mm, seeping-out of a rubber component of the compression layer 4 to the frictional power-transmission surface side through the knitted cloth 6 can be suppressed more reliably. It is particularly preferable that the thickness of the knitted cloth 6 is larger than or equal to 0.8 mm.

A surfactant or a hydrophilic softener may be contained in or stuck to the knitted cloth 6 as a hydrophilizing agent. Where hydrophilizing agent is contained in or stuck to the knitted cloth 6, when water droplets stick to the frictional power-transmission surface (knitted cloth 6), the droplets are quickly soaked by the surface of the hydrophilized knitted cloth 6 to form water film and then are absorbed by the cellulose-based natural spun yarn of the knitted cloth 6, as a result of which no water film remains on the frictional power-transmission surface. Thus, reduction of the friction coefficient of the frictional power-transmission surface in a wet state is suppressed more reliably.

A surfactant or a hydrophilic softener can be used as the hydrophilizing agent. Examples of applicable methods for making the hydrophilizing agent contained in or stuck to the knitted cloth 6 include spraying the hydrophilizing agent over the knitted cloth 6, coating the knitted cloth 6 with the hydrophilizing agent, and immersing the knitted cloth 6 in the hydrophilizing agent. Where the hydrophilizing agent is a surfactant, a method may be employed that causes a surfactant to be contained in the knitted cloth 6 by applying, at the time of manufacture of the V-ribbed belt 1, the surfactant on the surface of cylindrical outside mold having plural rib shapes carved on the inner circumferential surface thereof, and performing vulcanization shaping. Among the above methods, the method of immersing the knitted cloth 6 in the hydrophilizing agent is preferable because it can make the hydrophilizing agent contained in or stuck to the knitted cloth 6 more uniformly in a simple manner.

The term "surfactant" is a generic term of substances that have, in the molecule, a hydrophilic group which tends to fit to water and a hydrophobic group (lipophilic group) which tends to fit to oil. The surfactant has, in addition to a function of mixing a polar substance and a non-polar substance uniformly, functions of increasing the wettability by decreasing the surface tension and weakening friction at their interface by existing between substances.

There are no particular limitations on the type of the surfactant. The surfactant may be an ion surfactant, a non-ion surfactant, or the like. The non-ion surfactant may be a polyethylene glycol type non-ion surfactant or a polyhydric alcohol type non-ion surfactant.

A polyethylene glycol type non-ion surfactant is a non-ion surfactant in which a hydrophilic group is given by adding ethylene oxide to a hydrophobic base component having a hydrophobic group such as higher alcohol, alkyl phenol, higher fatty acid, polyhydric alcohol higher fatty acid ester, higher fatty acid amide, or polypropylene glycol.

Bonding treatment can be performed on the knitted cloth 6 to increase the adhesion to the rubber composition constituting the compression layer 4 (i.e., the rubber composition forming the surface of the rib portions 2). Examples of such bonding treatment on the knitted cloth 6 include immersion treatment to a resin-based treatment liquid in which an epoxy compound or isocyanate compound is dissolved in an organic solvent (e.g., toluene, xylene, or methyl ethyl ketone), immersion treatment to a resorcin-formalin-latex liquid (RFL liquid), and immersion treatment to a mucilage produced by dissolving a rubber composition in an organic solvent. Other examples of applicable methods of the bonding treatment include friction treatment in which a rubber composition is rubbed into the knitted cloth 6 by processing the knitted cloth 6 and the rubber composition with a calender roll, spreading treatment of applying mucilage to the knitted cloth 6, and coating treatment of laminating a rubber composition on the knitted cloth 6. By subjecting the knitted cloth 6 to the bonding treatment in the above manner, its adherence to the compression layer 4 is increased, whereby the knitted cloth 6 is prevented from peeling off during running of the V-ribbed belt 1. Furthermore, the wear resistance of the rib portions 2 can be increased by performing the bonding treatment.

It is preferable that no rubber composition seep out to the frictional power-transmission surface of the knitted cloth 6 (i.e., to the side of the surface to come into contact with the drive pulley 21 and the driven pulley 22), as a result of bonding the rubber composition that constitutes the compression layer 4 to the knitted cloth 6 by the above bonding treatment. When a rubber composition seeped out to the side of the frictional power-transmission surface from the knitted cloth 6, the water absorbability would lower and hence the friction coefficient in a wet state would decrease to a large extent to lower the resistance to sound generation with water. Thus, by preventing seeping-out of a rubber composition to the frictional power-transmission surface of the knitted cloth 6, sufficient water absorbability can be secured, whereby the resistance to sound generation with water can be increased.

(Manufacturing Method of V-Ribbed Belt 1)

A manufacturing method of the V-ribbed belt 1 will be described below with reference to FIG. 4. As shown in part (a) of FIG. 4, an unvulcanized tension layer sheet 3S is wound around a cylindrical inside mold 52 having a flexible jacket 51 attached to the outer circumference thereof, core wires 5 are wound spirally thereon, and an unvulcanized compression layer sheet 4S and a knitted cloth 6 are wound thereon (put thereon) sequentially, whereby a shaped body 10 is formed. Then the inside mold 52 around which the shaped body 10 is wound is set concentrically in the inner circumferential side of an outside mold 53 having plural rib shapes 53*a* carved on the inner circumferential surface thereof. At this time, a prescribed gap is set between the inner circumferential surface of the outside mold 53 and the outer circumferential surface of the shaped body 10.

As described above, during shaping of a V-ribbed belt 1, it is necessary to shape the knitted cloth 6 cylindrically to conform to the outer circumference of the compression layer sheet 4S. One method for this purpose is to prepare a seamless knitted cloth having no joints by using, for example, a circular knitting machine. In this case, however, it is necessary to prepare a seamless knitted cloth corresponding to the length (circumferential length) of the V-ribbed belt 1. When a knitted cloth that is too long (too long in circumferential length) for the length of the V-ribbed belt 1 is used, since the knitted cloth has an extra length, an overlap may occur to cause a quality abnormality. Conversely, When a knitted cloth that is too short (too short in circumferential length) is used, trouble is expected that, for example, the shape of rib portions 2 to be formed become improper or a rubber composition of the compression layer sheet 4S seeps out to the frictional power-transmission surface to lower the resistance to sound generation with water. Accordingly, to manufacture V-ribbed belts 1 having various lengths, it is necessary to stock the same number of in-process items, which would be wasteful.

In view of the above, to shape the knitted cloth 6 into a cylindrical shape so as to conform to the outer circumference of the compression layer sheet 4S, it is preferable to employ a method of preparing a cylindrical knitted cloth 6 by joining the two ends of a rectangular knitted cloth 6 depending on the length of the V-ribbed belt 1. In this case, a knitted cloth 6 having an optimum circumferential length can be prepared (can be adjusted) for any length of the V-ribbed belt 1, whereby the quality is made stable. Furthermore, the degree of freedom is high because a flat knitting machine can be used in addition to a circular knitting machine, and the manufacture become economical because only one kind of in-process item suffices.

Example methods for joining the two ends of a knitted cloth 6 include a method of cutting the knitted cloth 6 with a blade that is heated to a temperature around a melting temperature of yarn that constitutes the knitted cloth 6 and, at the same time, welding resulting cutting surfaces together (hot-melt and thermal welding), a method of performing cutting and welding at the same time by pressing a blade being vibrated by ultrasonic vibration against a knitted cloth 6 (ultrasonic welding), sewing machine-joining, overcasting, and butting. As for the timing to join the two ends of a knitted cloth 6, the joining may be performed either in advance of shaping or during shaping of a V-ribbed belt 1 (e.g., the two ends of a knitted cloth 6 are joined together on the compression layer sheet 4S that is wound around the inside mold 52). Hot-melt welding, ultrasonic welding, sewing machine-joining, and overcasting can be employed suitably in the case where the joining is performed before shaping of a V-ribbed belt 1, and butting can be employed suitably in the case where the joining is performed during shaping of a V-ribbed belt 1. Among the above methods, ultrasonic welding or butting are preferable because they can provide a seam having good appearance. The number of joined positions of the knitted cloth 6 may be either one or plural. From the viewpoints of reduction of the number of manufacturing steps and improvement of appearance, it is preferable that the number of joined positions of the knitted cloth 6 is one or two.

Subsequently, as shown in part (b) of FIG. 4, the above-mentioned flexible jacket 51 is expanded toward the inner circumferential surface of the outside mold 53 at a prescribed expansion coefficient (e.g., 1% to 6%), whereby the compression layer sheet 4S of the shaped body 10 and the knitted cloth 6 are press-fitted into the rib shapes 53*a* of the outside mold 53. Then, a vulcanization treatment (e.g., 160° C., 30 minutes) is performed in this state.

Figure 4:
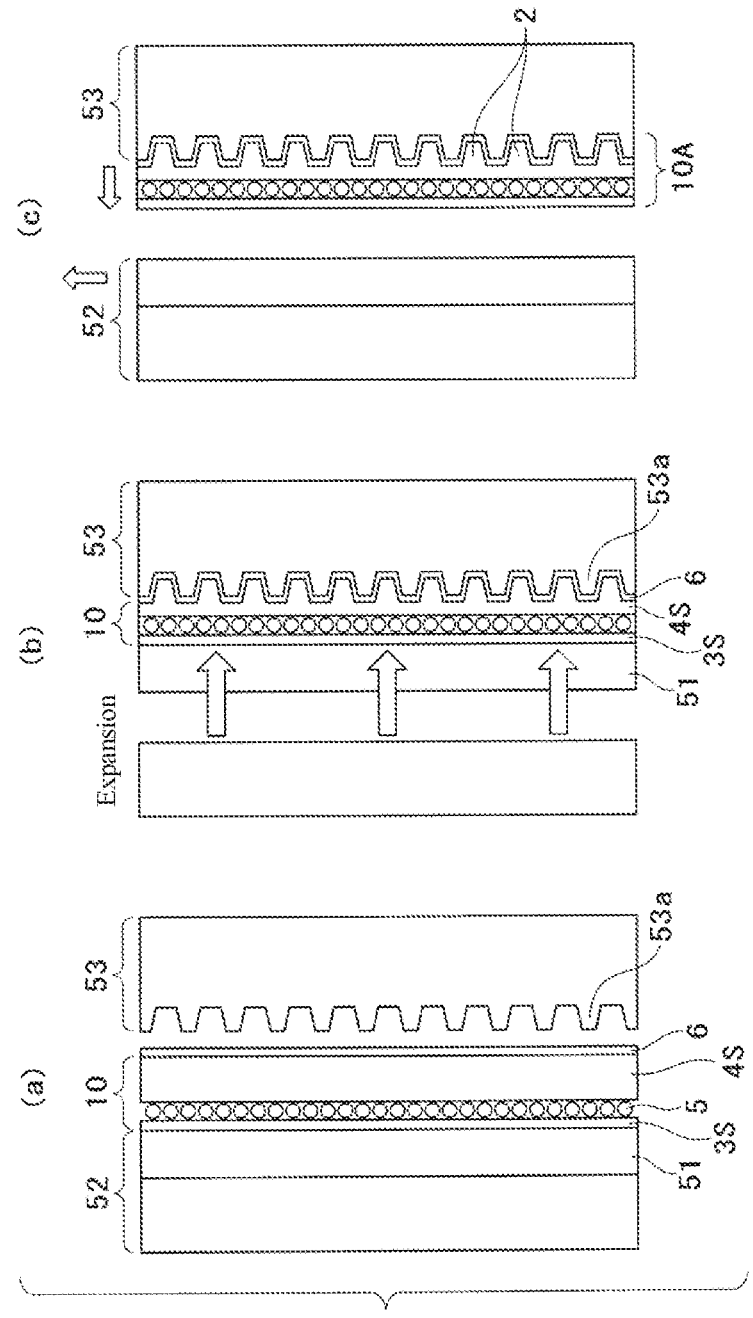
FIG. 4 is a conceptual diagram for description of a manufacturing method of the V-ribbed belt.

Finally, as shown in part (c) of FIG. 4, after the inside mold 52 is detached from the outside mold 53 and a vulcanized rubber sleeve 10A having plural rib portions 2 are removed from the outside mold 53, the vulcanized rubber sleeve 10A is cut in the circumferential length direction with a prescribed width using a cutter, whereby a final V-ribbed belt 1 is obtained. The manufacturing method of the V-ribbed belt 1 is not limited to the above method. For example, another known method such as a method disclosed in JP-A-2004-82702 can be employed.

In the above V-ribbed belt 1, since the knitted cloth 6 which covers the frictional power-transmission surface side includes the cellulose-based natural spun yarn, the water absorbability and the resistance to sound generation with water of the V-ribbed belt 1 can be increased. Since the knitted cloth 6 includes the polyester-based composite yarn, the elasticity of the knitted cloth 6 can be increased and the adaptability of the knitted cloth 6 to V-shaped rib portions 2 can be increased when the V-shaped rib portions 2 are formed in the V-ribbed belt 1 by the molds (inside mold 52 and outside mold 53). Furthermore, since the knitted cloth 6 includes the polyamide-based yarn, the wear resistance can be increased, wear of the cellulose-based natural spun yarn can be suppressed, and the resistance to sound generation with water can be maintained for a long time.

Since the elasticity of the knitted cloth 6 is increased by employing weft-knitting in the knitted cloth 6 which covers the frictional power-transmission surface side of the V-ribbed belt 1, it is possible to make the rib portions 2 not prone to suffer a shape failure in a manufacturing process for forming the V-shaped rib portions 2 in the V-ribbed belt 1 by the molds (inside mold 52 and outside mold 53). Furthermore, since the knitted cloth 6 has a multilayer structure, seeping-out of a rubber component of the compression layer 4 to the frictional power-transmission surface side through the knitted cloth 6 is suppressed, whereby the difference between a friction coefficient in a dry state and a friction coefficient in a wet state of the frictional power-transmission surface can be made small and hence the resistance to sound generation with water can be increased.

Since the cellulose-based natural spun yarn which is high in water absorbability is provided in the frictional power-transmission surface-side layer of the V-ribbed belt 1, water that has entered between the V-ribbed belt 1 and the drive pulley 21 and the driven pulley 22 can be absorbed quickly and the friction coefficient can be stabilized (i.e., reduction of the friction coefficient in a wet state can be suppressed), whereby the resistance to sound generation with water can be increased. Furthermore, since the polyamide-based yarn which is high in wear resistance is provided in the frictional power-transmission surface-side layer, wear of the cellulose-based natural spun yarn can be suppressed, whereby the resistance to sound generation with water can be maintained for a long time.

Examples

As shown in table 1 and table 2, V-ribbed belts of Examples 1-5 and Comparative Examples 1-4 were prepared, and a rubber seeping-out observation test for observing presence or absence of seeping-out of rubber to the frictional power-transmission surface, a friction coefficient measurement test, a misalignment sound generation evaluation test (measurement of a sound generation limit angle), and a wear resistance test were carried.

In all of Examples 1-5, a multilayer weft-knitted cloth formed by double moss stich was employed. In the multilayer weft-knitted cloth, cotton yarn (spun yarn of #50) was used as the cellulose-based natural spun yarn (A) and PTT/PET conjugate yarn (manufactured by Toray Industries, Inc., 84 dtex) was used as the polyester-based composite yarn (B). The polyamide-based yarn (C) was nylon filament yarn (manufactured by Toray Industries, Inc., nylon 66, 110 dtex) in Examples 1-4 and aramid filament yarn (manufactured by Teijin Co., Ltd., Technora, 110 dtex) in Example 5. In Examples 1-5, knitting was performed such that the PTT/PET conjugate yarn was provided on the compression layer side and the cotton yarn and the polyamide-based yarn were provided on the frictional power-transmission surface side (i.e., the side to come into contact with the pulleys). In Examples 1-4, the ratio (mass ratio) between the cotton yarn and the polyamide-based yarn was varied and influences on the resistance to sound generation with water and the wear resistance were evaluated.

In Comparative Example 1, a multilayer weft-knitted cloth was employed in which cotton yarn was used as the cellulose-based natural spun yarn (A), PTT/PET conjugate yarn was used as the polyester-based composite yarn (B), and polyamide-based yarn (C) was not included. In Comparative Example 2, a single layer weft-knitted cloth including covering finished yarn of the cotton and polyurethane was employed. In Comparative Example 3, a single layer weft-knitted cloth including taslan finished yarn of the nylon and polyurethane was employed. In Comparative Example 4, a knitted cloth having the same configuration as Example 1 was employed upside down with respect to the case of Example 1, such that the PTT/PET conjugate yarn was located on the frictional power-transmission surface side and the cotton yarn and the nylon filament yarn were located on the compression layer side.

(Rubber Seeping-Out Observation Test)

In the rubber seeping-out observation test, the frictional power-transmission surface of the V-ribbed belt 1 was photographed with a magnification of 20 times by using a microscope and an area ratio of a rubber-exposed portion in the frictional power-transmission surface was calculated using image analysis software. An average of values measured at five arbitrary positions was calculated. In the case where the area ratio of a rubber-exposed portion in the frictional power-transmission surface was smaller than 5%, seeping-out of rubber was judged to be absent. In the case where the area ratio of a rubber-exposed portion in the frictional power-transmission surface was larger than or equal to 5%, seeping-out of rubber was judged to be absent.

(Friction Coefficient Measurement Test)

Figure 5:
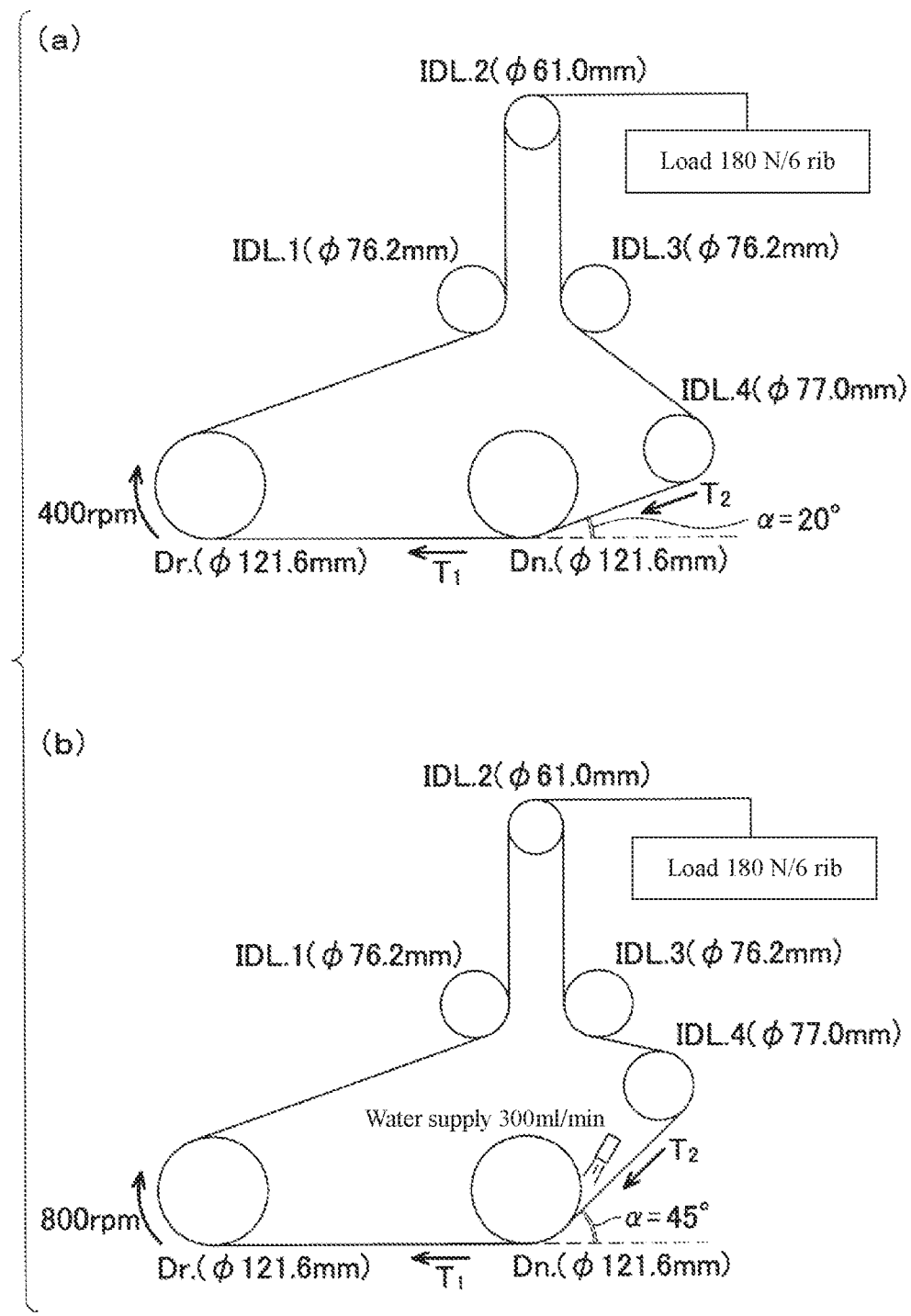
FIG. 5 is a conceptual diagram for description of friction coefficient measurement tests in a dry state (part (a)) and a wet state (part (b)).

The friction coefficient measurement test was carried out by using a test machine in which a drive pulley (Dr.) having a diameter of 121.6 mm, an idler pulley (IDL.1) having a diameter of 76.2 mm, an idler pulley (IDL.2) having a diameter of 61.0 mm, an idler pulley (IDL.3) having a diameter of 76.2 mm, an idler pulley (IDL.4) having a diameter of 77.0 mm, and a driven pulley (Dn.) having a diameter of 121.6 mm were arranged as shown in FIG. 5. The test was carried out by putting the V-ribbed belt 1 on these pulleys.

As shown in part (a) of FIG. 5, in a test in a dry state that assumes an ordinary drive, the V-ribbed belt 1 was caused to run at room temperature (23° C.) by setting the rotation speed of the drive pulley (Dr.) at 400 rpm, setting the angle $\alpha$ at which the belt was wound on the driven pulley (Dn.) at $7c/9$ radian (20°), and applying a constant load (180 N/6 ribs). The torque of the driven pulley (Dn.) was increased, and a friction coefficient $\mu$ was calculated according to Equation (1) on the basis of a torque value of the driven pulley (Dn.) when the slip speed of the V-ribbed belt 1 with respect to the driven pulley (Dn.) became highest (100% slip).

$$\mu = \ln(T_1/T_2)/\alpha \qquad (1)$$

In which $T_1$ is the tight side tension and $T_2$ is the slack side tension.

The slack side tension $T_2$ on the entrance side of the driven pulley (Dn.) is equal to the constant load (180 N/6 ribs) and the tight side tension $T_1$ on the exit side is equal to the constant load plus tension produced by the torque of the driven pulley (Dn.).

As shown in part (b) of FIG. 5, in a test in a wet state that assumes a drive in the rain, the rotation speed of the drive pulley (Dr.) was set at 800 rpm, the angle $\alpha$ at which the belt was wound on the driven pulley (Dn.) was set at $\pi/4$ radian (45°), and water was supplied continuously to vicinity of the entrance of the driven pulley (Dn.) at a rate of 300 ml/min. The other conditions were the same as in the test in a dry state, and a friction coefficient $\mu$ was calculated according to Equation (1).

(Misalignment Sound Generation Evaluation Test)

Figure 6:
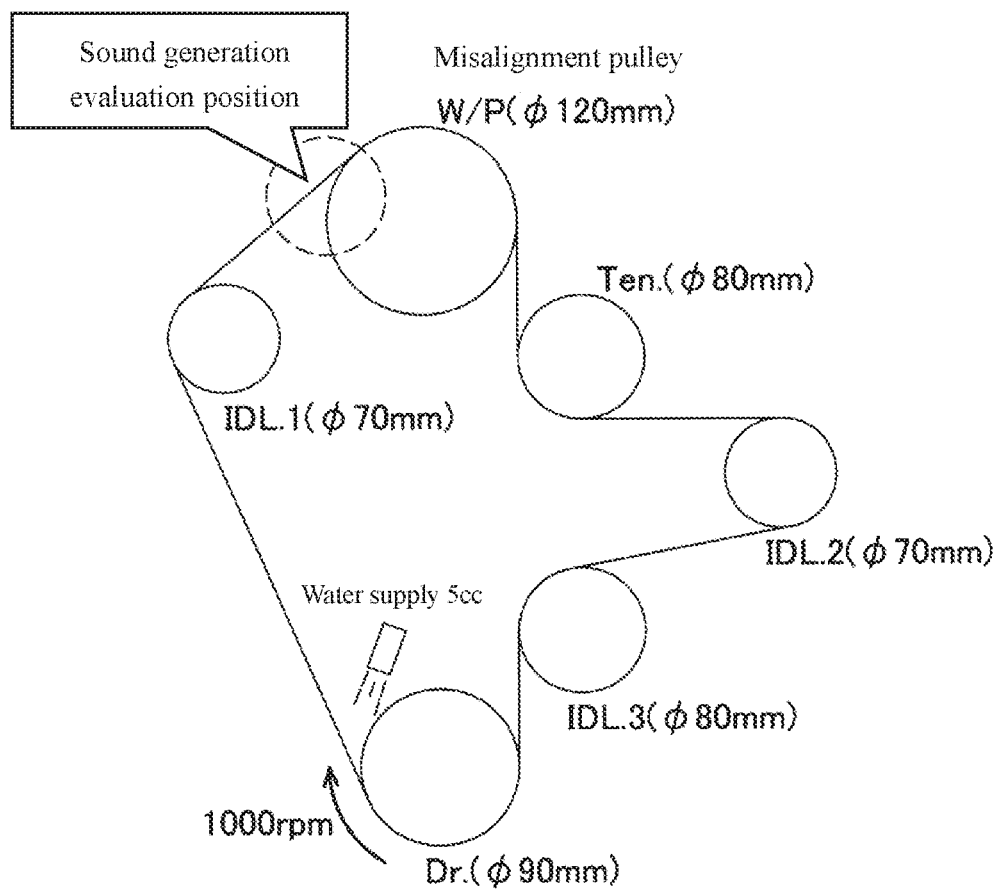
FIG. 6 is a conceptual diagram for description of a misalignment sound generation evaluation test.

The misalignment sound generation evaluation test was carried out by using a test machine in which a drive pulley (Dr.) having a diameter of 90 mm, an idler pulley (IDL.1) having a diameter of 70 mm, a misalignment pulley (W/P) having a diameter of 120 mm, a tension pulley (Ten.) having a diameter of 80 mm, an idler pulley (IDL.2) having a diameter of 70 mm, and an idler pulley (IDL.3) having a diameter of 80 mm were arranged as shown in FIG. 6. The axial span between the idler pulley (IDL.1) and the misalignment pulley (W/P) was set at 135 mm, and adjustments were made such that all the pulleys are located in the same plane (misalignment angle: 0°).

The V-ribbed belt 1 was put on the pulleys of the test machine. The V-ribbed belt 1 was caused to run at a room temperature (23° C.), under a condition in which the rotation speed of the drive pulley (Dr.) was set at 1,000 rpm, the belt tension was set at 300 N/6 ribs, and water of 5 cc was supplied regularly (at intervals of about 30 sec) to the frictional power-transmission surface of the V-ribbed belt 1 in vicinity of the exit of the drive pulley (Dr.), with such misalignment that the misalignment pulley (W/P) was moved to the viewer's side with respect to the other individual pulleys (the misalignment angle is increased gradually). And a misalignment angle (sound generation limit angle) at which sound generation occurred in vicinity of the entrance of the misalignment pulley (W/P) was determined. Assuming an ordinary drive, a sound generation limit angle was determined in a similar manner also in a dry state that employs no water supply. A larger sound generation limit angle means higher resistance to sound generation.

(Wear Resistance Test)

Although not shown in any drawings, the wear resistance test was carried out by using a test machine in which a drive pulley (Dr.) having a diameter of 120 mm, an idler pulley (IDL.1) having a diameter of 75 mm, a tension pulley (Ten.) having a diameter of 60 mm, and a driven pulley (Dn.) having a diameter of 120 mm were arranged in this order. Belt mass values were measured before and after a test in which the V-ribbed belt 1 was put on the pulleys and caused to run for 200 hours in an atmosphere of 120° C., the rotation speed of the drive pulley (Dr.) was set at 4,900 rpm, and an axial load of 890 N was applied to the tension pulley (Ten.) as an initial load. Then, a wear ratio was determined according to Equation (2).

$$\text{(Wear ratio)} = \{(\text{mass before test}) - (\text{mass after test})\} / (\text{mass before test}) \times 100 (\%). \quad (2)$$

A smaller wear ratio means higher wear resistance.

(Regarding Thickness of Knitted Cloth)

Prepared V-ribbed belts of Examples 1-5 and Comparative Examples 1-4 were cut in the belt width direction and resulting cross sections were photographed by using a microscope, whereby an average thickness value of the knitted cloth 6 covering the frictional power-transmission surface was measured.

TABLE 1

| | | | | Examples | | | | |
|---|---|---|---|---|---|---|---|---|
| | | | | 1 | 2 | 3 | 4 | 5 |
| Knitted cloth | Fiber structure (whole knitted cloth) | Layer structure Cellulose-based natural spun yarn (A) | Material processing | Multilayer Cotton — | Multilayer Cotton — | Multilayer Cotton — | Multilayer Cotton — | Multilayer Cotton — |
| | | Polyester-based composite yarn (B) | Material processing | PTT/PET Conjugate yarn | PTT/PET Conjugate yarn | PTT/PET Conjugate yarn | PTT/PET Conjugate yarn | PTT/PET Conjugate yarn |
| | | Polyamide-based filament yarn (C) | Material processing | Nylon — | Nylon — | Nylon — | Nylon — | Aramid — |
| | | Yarn composition ratio (mass ratio) | | Cotton: 40% PTT/PET: 40% Nylon: 20% | Cotton: 20% PTT/PET: 40% Nylon: 40% | Cotton: 55% PTT/PET: 40% Nylon: 5% | Cotton: 5% PTT/PET: 40% Nylon: 55% | Cotton: 40% PTT/PET: 40% Aramid: 20% |
| | Structure of each layer of multilayered knitted cloth | Frictional power-transmission surface side Compression layer side | | Cotton/nylon PTT/PET | Cotton/nylon PTT/PET | Cotton/nylon PTT/PET | Cotton/nylon PTT/PET | Cotton/aramid PTT/PET |
| | | Bulkiness (cm³/g) | | 3.2 | 3.2 | 3.2 | 3.2 | 3.2 |
| V-ribbed belt | Thickness (mm) of knitted cloth in belt | | | 0.8 | 0.8 | 0.8 | 0.8 | 0.8 |
| | Seeping-out of rubber to frictional power-transmission surface | | | Absent | Absent | Absent | Absent | Absent |
| | Friction coefficient μ | | Dry state | 1 | 0.9 | 1 | 0.8 | 1 |
| | | | Wet state | 0.8 | 0.7 | 1 | 0.6 | 0.8 |
| | | | Difference Δμ | 0.2 | 0.2 | 0 | 0.2 | 0.2 |
| | Sound generation limit angle | | Dry state | 3.5 | 3.3 | 3.5 | 2.9 | 3.5 |
| | | | Wet state | 3.3 | 2.9 | 3.3 | 2.3 | 3.3 |
| | Wear resistance: wear ratio (%) after 200 h run | | | 3.6 | 3.5 | 4.8 | 3.3 | 3.2 |

TABLE 2

| | | | | Comparative Examples | | | |
|---|---|---|---|---|---|---|---|
| | | | | 1 | 2 | 3 | 4 |
| Knitted cloth | Fiber structure (whole knitted cloth) | Layer structure Cellulose-based natural spun yarn (A) | Material processing | Multilayer Cotton — | Single layer Cotton/PU Covering finished yarn | Single layer — — | Multilayer Cotton — |

TABLE 2-continued

|  |  |  |  | Comparative Examples | | | |
|---|---|---|---|---|---|---|---|
|  |  |  |  | 1 | 2 | 3 | 4 |
| V-ribbed belt | Structure of each layer of multilayered knitted cloth | Polyester-based composite yarn (B) | Material processing | PTT/PET Conjugate yarn | — | — | PTT/PET Conjugate yarn |
|  |  | Polyamide-based filament yarn (C) | Material processing | — | — | Nylon/PU Taslan finished yarn | Nylon |
|  |  | Yarn composition ratio (mass ratio) |  | Cotton: 60% PET/PTT: 40% | Cotton/PU: 100% | Nylon/PU: 100% | Cotton: 40% PTT/PET: 40% Nylon: 20% |
|  |  | Frictional power-transmission surface side |  | Cotton | Cotton/PU | Nylon/PU | PTT/PET |
|  |  | Compression layer side |  | PTT/PET | — | — | Cotton/nylon |
|  |  | Bulkiness (cm³/g) |  | 3.2 | 2.3 | 2 | 3.2 |
|  | Thickness (mm) of knitted cloth in belt |  |  | 0.6 | 0.6 | 0.5 | 0.8 |
|  | Seeping-out of rubber to frictional power-transmission surface |  |  | Absent | Present | Present | Absent |
|  | Friction coefficient μ |  | Dry state | 1.2 | 1.4 | 0.8 | 1 |
|  |  |  | Wet state | 0.8 | 0.9 | 0.4 | 0.5 |
|  |  |  | Difference Δμ | 0.4 | 0.5 | 0.4 | 0.5 |
|  | Sound generation limit angle |  | Dry state | 3.7 | 2.6 | 2.5 | 3.5 |
|  |  |  | Wet state | 3.3 | 2.3 | 2.1 | 1.9 |
|  | Wear resistance: wear ratio (%) after 200 h run |  |  | 6.8 | 5.8 | 4.9 | 4.2 |

Cotton: Spun yarn of #50
PTT/PET conjugate yarn: Manufactured by Toray Industries, Inc., 84 dtex
Nylon filament yarn: Manufactured by Toray Industries, Inc., nylon 66, 110 dtex
Aramid filament yarn: Teijin Co., Ltd., Technora, 110 dtex
(Considerations on Results of Each Test)

In Examples 1-5 in which the cellulose-based natural spun yarn (A), the polyester-based composite yarn (B), and the polyamide-based yarn (C) were included in the knitted cloth 6 and the cellulose-based natural spun yarn (A) and the polyamide-based yarn (C) were provided in the frictional power-transmission surface-side layer, no seeping-out of rubber to the frictional power-transmission surface occurred, the difference Δμ between the friction coefficient in a dry state and the friction coefficient in a wet state was small, and the resistance to sound generation with water was high. Furthermore, the wear ratio after a 200 h run was small, and the wear resistance was high.

With attention paid to influences of the mass ratio between cotton and nylon in the knitted cloth 6 on the resistance to sound generation with water and the wear resistance, in Examples 1, 2, and 4 in which the nylon mass ratio was 20% to 55%, the difference Δμ between the friction coefficient in a dry state and the friction coefficient in a wet state was small (i.e., the resistance to sound generation with water was high) and the wear resistance was high. In Example 3 in which the nylon mass ratio was as relatively low as 5%, the wear resistance was relatively low whereas the difference Δμ between the friction coefficient in a dry state and the friction coefficient in a wet state was the smallest.

In Example 5 in which aramid was used as the polyamide-based yarn (C), the wear resistance was increased whereas the resistance to sound generation with water was kept the same as in Example 1 which employs nylon.

On the other hand, in Comparative Example 1 which did not include polyamide-based yarn (C), the wear resistance was decreased to a large extent. In Comparative Example 2 which employed covering finished yarn of cotton/polyurethane, the resistance to sound generation with water was low probably because of a presence of seeping-out of rubber to the frictional power-transmission surface, and the wear resistance was also low. In Comparative Example 3 which employed taslan finished yarn of nylon/polyurethane, the resistance to sound generation with water was approximately the same as in Comparative Examples 1 and 2, and the wear resistance was increased to some extent. However, seeping-out of rubber to the frictional power-transmission surface occurred and the performance of Comparative Example 3 was insufficient for practical use. In Comparative Example 4 in which the structure of the knitted cloth was the same as in Example 1 but the knitted cloth was used upside down such that cotton and nylon were located on the compression layer side, the resistance to sound generation with water and the wear resistance were low probably because the advantages of high water absorbability and wear resistance of cotton and nylon were not utilized sufficiently.

Although the invention has been described in detail by referring to the particular embodiment, it is apparent to those skilled in the art that various modifications and changes can be applied without departing from the spirit and scope of the invention.

The present application is based on Japanese Patent Application No. 2017-102797 filed on May 24, 2017 and Japanese Patent Application No. 2018-097341 filed on May 21, 2018, the contents of which are incorporated herein by reference.

REFERENCE SIGNS LIST

1: V-ribbed belt
2: Rib portion
3: Tension layer
4: Compression layer
5: Core wire
6: Knitted cloth
10: Shaped body
21: Drive pulley
22: Driven pulley
23: V-shaped groove
51: Flexible jacket 52: Inside mold
53: Outside mold
53a: Rib shape

The invention claimed is:

1. A V-ribbed belt having a frictional power-transmission surface constituted by a multilayer weft-knitted cloth, wherein:
   the multilayer weft-knitted cloth comprises a cellulose-based natural spun yarn, a polyester-based composite yarn, and a polyamide-based yarn;
   at least the cellulose-based natural spun yarn and the polyamide-based yarn are disposed in a layer on a frictional power-transmission surface side; and
   the multilayer weft-knitted cloth has a content of the cellulose-based natural spun yarn of 5 to 40 mass %.

2. The V-ribbed belt according to claim 1, wherein the multilayer weft-knitted cloth has a content of the polyamide-based yarn of 5 to 60 mass %.

3. The V-ribbed belt according to claim 1, wherein the multilayer weft-knitted cloth has a mass ratio between the polyamide-based yarn and the cellulose-based natural spun yarn, satisfying a relation of (polyamide-based yarn):(cellulose-based natural spun yarn)=5:95 to 95:5.

4. The V-ribbed belt according to claim 1, wherein the polyester-based composite yarn included in the multilayer weft-knitted cloth is a bulk textured yarn comprising two or more kinds of polymers having different thermal shrinkage ratios from each other.

5. The V-ribbed belt according to claim 1, wherein the polyester-based composite yarn included in the multilayer weft-knitted cloth is a conjugate yarn comprising a polyethylene terephthalate (PET).

6. The V-ribbed belt according to claim 1, wherein the polyamide-based yarn included in the multilayer weft-knitted cloth comprises a nylon or an aramid fiber.

7. The V-ribbed belt according to claim 1, wherein each of yarns constituting the multilayer weft-knitted cloth has filaments or fibers twisted together.

8. The V-ribbed belt according to claim 1, wherein the multilayer weft-knitted cloth comprises no polyurethane.

9. The V-ribbed belt according to claim 1, wherein the multilayer weft-knitted cloth covering the frictional power-transmission surface has a thickness of 0.6 mm or larger.

10. The V-ribbed belt according to claim 1, wherein the cellulose-based natural spun yarn and the polyamide-based yarn are arranged so as to be distributed uniformly, where 12 adjacent yarns include at least one polyamide-based yarn, in the layer on the frictional power-transmission surface side of the multilayer weft-knitted cloth.

11. The V-ribbed belt according to claim 1, comprising a rubber as a component, wherein:
   the frictional power-transmission surface side of the rubber is covered with the multilayer weft-knitted cloth; and
   the multilayer weft-knitted cloth prevents the rubber from seeping out to the frictional power-transmission surface, an area ratio of a portion where the rubber is exposed to the frictional power transmission surface is less than 5%.

12. A manufacturing method of the V-ribbed belt according to claim 1, comprising:
   covering an unvulcanized compression layer sheet with a cylindrical multilayer weft-knitted cloth in which two ends of the multilayer weft-knitted cloth are joined to each other; or
   jointing the two ends of the multilayer weft-knitted cloth to each other on an unvulcanized compression layer sheet.

* * * * *